Sept. 3, 1957  A. TALALAY  2,804,653
METHOD FOR THE MOLDING OF FOAM RUBBER PRODUCTS
Filed March 6, 1953
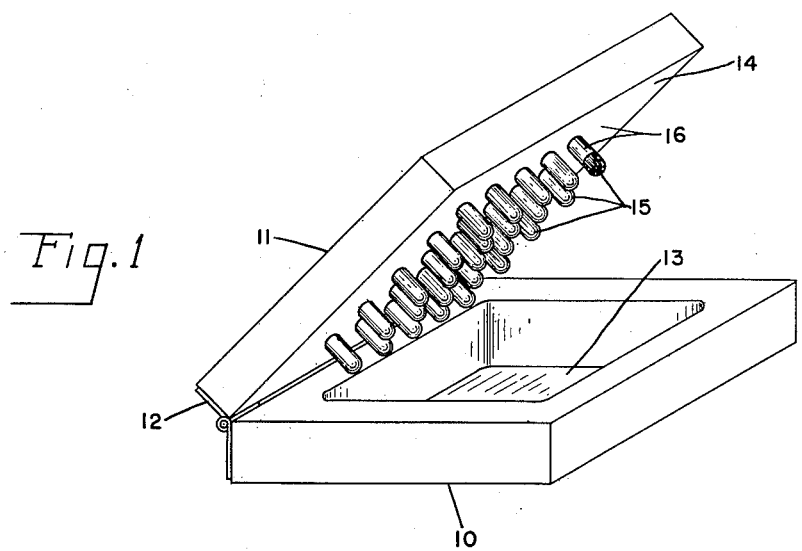
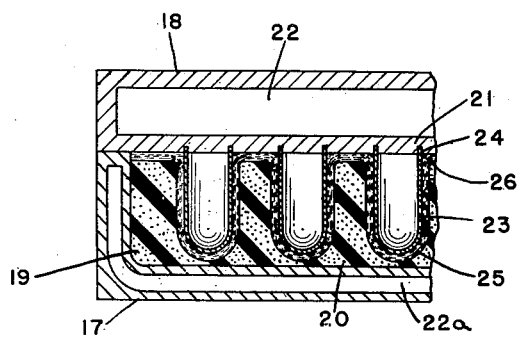
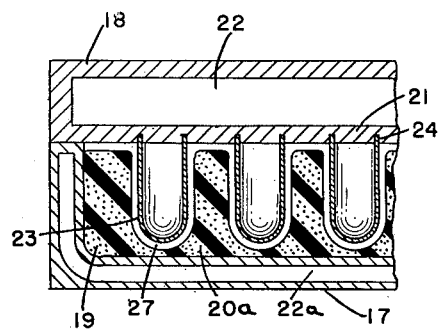
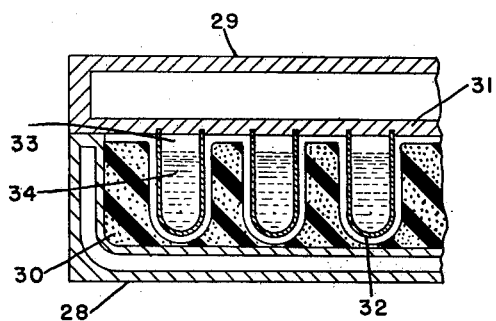
INVENTOR.
ANSELM TALALAY
BY
ATT'Y.

United States Patent Office 2,804,653
Patented Sept. 3, 1957

2,804,653

METHOD FOR THE MOLDING OF FOAM RUBBER PRODUCTS

Anselm Talalay, New Haven, Conn., assignor, by direct and mesne assignments, of one-half to The Dayton Rubber Company, Dayton, Ohio, a corporation of Ohio, and one-half to The B. F. Goodrich Company, Akron, Ohio, a corporation of New York Application March 6, 1953, Serial No. 340,737

2 Claims. (Cl. 18—53)

The present invention relates to improvements in the manufacture of foam rubber articles and particularly to improvements in a method for molding such articles. More specifically, it relates to the manufacture of foam rubber articles by a method comprising the step of cooling the foamed aqueous dispersion of elastomeric material below the freezing point of the dispersion, such as for instance has been described in United States Patent No. 2,432,353 to Talalay.

In the molding of articles from a foamed or frothed latex dispersion it is common practice to employ a metallic mold comprising a bottom dish member and an upper pin plate, both sections being adapted to be cooled and heated, e. g. by intimate contact with a liquid or gaseous cooling medium. The upper member is adapted to carry a plurality of core pins which may themselves be hollow and so arranged on the pin plate as to partially occupy the mold cavity formed by the lower dish member of the mold when said pin plate and said dish member are in operative engagement forming a completely closed mold cavity. The purpose of these core pins is inter alia the effective cooling and heating of the mass of the foam molding.

After vulcanization of a foam rubber article in the closed mold cavity above described, it is, of course, necessary that the pin plate be removed from its cavity-closing engagement with the dish member so that the article may be removed from the mold. Because of the intimacy of the contact between the core pins mounted on the pin plate and the foamed rubber composition and because of the natural tendencies of the latter to adhere to the former, considerable difficulty has been encountered in stripping the vulcanized foam rubber article from the pin plate with its depending core pins without seriously damaging the product. Waxes, lubricants and "dopes" previously proposed for use as releasing agents between the core pins, pin plate and the vulcanized foam rubber have frequently failed to provide the necessary ease of stripping. Also, it has been found that such mold release agents had to be applied anew before each molding causing delay, labor and inconvenience. The difficulty of removing the vulcanized foam rubber article from the pin plate is frequently further accentuated by the fact that the joints at the point of the juncture of pin and pin plate either present a crevice or parting line which can be penetrated by the liquid foam or at best present an irregular surface rendering the stripping of the product more difficult because of the intricate engagement of the foam rubber and the pin plate at these irregularities. Even were it not for such irregularities, the sharp corners created by the intersection of the core pins with the core plate are such as to impart sharp parting lines to the molded article which are easily damaged and broken away either in the stripping of the mold or even during subsequent usage of the article.

It is accordingly an object of the present invention to provide a method for the molding of foam rubber articles wherein the article may be removed or stripped from the mold with a minimum of effort and no damage to the molded article.

It is another object of the present invention to provide a method for the molding of foam rubber articles such that surface irregularities in the confining surfaces of the cavities will not be transferred to the molded article.

It is still another object of the present invention to provide a method for molding foam rubber articles wherein the previously objectionable sharp parting lines and edges will be eliminated.

It is a further object of the present invention to provide a method for the manufacture of molded foam rubber articles in which the time for the production cycle will be reduced and the quality of the product improved.

It is a still further object of the present invention to provide a method for the manufacture of foam rubber articles wherein the properties of the article to the full depth of the extension of the core pins will be uniform.

It is an additional object of the present invention to provide a novel method for molding of foam rubber in molds having core pins.

Other objects and advantages of this invention will be apparent from a reading of the following disclosure wherein it is proposed that, prior to the closing of the mold and the subjection of the same to freezing and/or vulcanizing conditions, the pin plate be independently subjected to conditions of low temperature such as, for example, by the circulation through the hollow interior thereof of a brine of sufficiently low temperature. The low temperature and the time of subjection of the pin plate thereto should be such that the surfaces of the core pins and the surface of the pin plate cover will be brought to temperatures below the freezing point of water. It is contemplated that the relative humidity or the water vapor content of the atmosphere surrounding the pin plate at the time it is subjected to these low temperatures will be such that a thin coating of ice or frost will form upon said surfaces of the core pins and the pin plate. Where conditions of the atmosphere are such that upon the previously described reduction in temperature the ice or frost will not form naturally, the same may be provided by spraying a fine mist of water or similar liquid, the freezing point of which is above the temperature to which the surfaces of the core pins and the pin plate have been reduced. It is further proposed that the reduced temperatures of the surfaces which are coated with the frost or thin film of ice will be maintained at their low level until irreversible coagulation or gelling of the frothed latex has been achieved, as for example, would be the case in the process described in the patent to Talalay No. 2,432,353. The film of ice thus established and maintained replaces the actual surfaces of the core pins and pin plate as the limiting and confining influence on the molded article and it is this film of ice which actually determines the contour and size of such article, during the formative stages of the foam rubber molding.

One effect of the influence of this thin ice film is that it increases by twice its thickness the diameter of the core pin during the filling of the mold with foam and coagulation of the foam composition. The recesses or depressions imparted to the foam rubber article by these core pin so coated are accordingly of greater dimensions than the actual core pins themselves in their uncoated stage. It follows that upon thawing and vulcanization, the core pins will be in a less intimate contact with the foam rubber composition so that the pins and the plate to which they are mounted may be readily stripped from the vulcanized article with no threat of damage thereto. The film of ice about the core pins and the pin plate at the same time forms a continuous, smooth and regular surface which serves to protect the molded article from the surface irregularities, crevices, and sharp parting lines present in the uncoated mold member until the shape of said article has been finally fixed by the freezing and the irreversible coagulation of the rubber composition. It is to be noted that the ice film is present with its limiting and shaping influence at the time in the production cycle when it is needed most; that is, when the foam composition is liquid and possible under pressure from expansion. On the other hand, after the ice is thawed in preparation for the final vulcanization stage, the latex is no longer liquid and can neither penetrate the cracks or crevices in the pins or the pin plate nor strongly adhere to the surface thereof.

The following detailed description of the present invention is in conjunction with the attached drawings.

In the drawings:

Figure 1 is a perspective of a typical core pin type mold to be incorporated in the method of the present invention.

Figure 2 is a vertical cross section through a closed mold similar to that in Figure 1.

Figure 3 is a vertical cross section through the mold of Figure 2 showing the same as it appears after the production cycle has been completed.

Figure 4 is a vertical cross section through another core pin type mold similar to those shown above but having liquid filled core pins.

Referring now to Figure 1, a typical mold adaptable to the method of the present invention is shown to consist of a lower dish member 10 and upper pin plate member 11 pivotally connected by hinge 12 so that, upon closure of said pin plate upon said dish member, the mold cavity 13 within the dish member 10 will be partially occupied by the core pins 15 mounted in dependent position from the cavity defining walls 14 of said pin plate 11. Although the pin plate is shown to be hinged to the lower mold member, it is to be understood that the two respective members may be vertically acting and may be opened and closed either manually or automatically. By any well-known means (not shown) a refrigerant or brine may be circulated through the hollow-walled pin plate 11 so that the cavity forming wall 14 thereof and the core pin 15 mounted thereon may be cooled in an open atmosphere prior to the closing of the mold. This cooling should be continued until said surfaces are brought to a temperature at least below the frost point of the atmosphere to which the pin plate is exposed, said frost point being the temperature at which the moisture from the atmosphere will form as frost upon said surfaces. Since, in keeping with the above-described Talalay patent it will be desirable to bring the temperature of the mold to minus 30° C., the same low temperature service may be employed for the formation of the frost or ice coating 16, the only difference being that this low temperature service is applied to the pin plate independently prior to its being closed upon and thus immersed into the foam composition. If the relative humidity of the atmosphere to which the pin plate is exposed during the pre-frosting is such that frost will not conveniently form, it is possible to spray the surfaces with a mist of water to form the desired ice film.

The effects of this ice coating thus formed are shown in Figures 2 and 3 where the lower dish member 17 and pin plate 18 are shown in closed relation confining within the completely closed cavity 19 the expanded foam latex composition 20. To the cavity wall 21 adjacent the hollow interior 22 of the pin plate 18 are mounted the core pins 23 which, in a typical situation, might be joined to the inner surface 21 of the pin plate 18 by welding or otherwise cementing the open end of the hollow pin 23 in an annular groove 24 extending at least partially into the inner wall 21 of the pin plate. The coating of ice 25 forms a smooth and continuous wall separating the core pin 23 and pin plate cavity wall 21 from the rubber composition 20. The thickness of the frost deposit may be ten to thirty thousandths of an inch and it should be borne in mind that the density of frost may be as low as 15 pounds per cubic foot. The manner in which this specific protection applies against sharp parting lines and the filling of small cracks and crevices in the mold wall, particularly at points of juncture between mold walls and pin plate, is shown by the smooth and continuous contour of the thin ice film at 26. In Figure 3 the foam rubber composition 20a has been finally vulcanized and the ice layer 25 of Figure 2 has been melted away leaving the foam composition in much less intimate contact with the mold surfaces than would be the case without pre-frosting the pins. Apparent from this view are the smooth and continuous surfaces imparted to the molded article and the very slightly increased core hole dimensions which will facilitate stripping the molded article from the pins.

In the particular adaptation of the present invention to the foam rubber molding process described in the previously mentioned Talalay Patent No. 2,432,353, the upper pin plate may be subjected to the usual refrigerant or cold brine service at minus 25° F. while said upper plate is so exposed to the atmosphere prior to closing as explained above. Once the desired ice film has formed, the partially expanded aqueous dispersion of latex containing the usual compounding ingredients to which has been added say a potassium oleate soap as a stabilizer, and peroxide catalysed with yeast or catalase as foaming agent is cast into the cavity 19 within the lower mold member 17. The upper mold member 18 may be immediately closed upon the lower mold member 17, however, it has been found desirable to wait until the foamed latex composition has expanded to fill approximately 75 percent of the mold cavity 19 before so closing the mold and immersing the ice coated pins into the same. After sufficient time has elapsed for complete filling of the mold cavity as particularly defined by the ice coating 25, the temperature of the mold dish is brought to minus 30° C. by circulation through hollow chambers such as 22 and 22a of Figures 2 and 3 and there held for a period, sufficient to freeze the whole mass of the foam after which the completely stereoreticulate foam rubber composition is irreversibly coagulated therewithin by the circulation through the inter-connecting interstices of the foamed and frozen rubber composition of a suitable fluid coagulant such as carbon dioxide gas for a few minutes. The foam rubber article within the mold having thus been fixed and set up the ice layer 25 has now served its useful purpose. In keeping with the procedures of the method of the Talalay patent, tempering liquids are thereafter circulated through the hollow-walled portions of the mold prior to subjecting the same to vulcanizing temperatures as, for example, live steam at 215° F. for 15 minutes. During this tempering and vulcanizing procedure, the ice having melted away, the contact between the mold pin plate and the rubber composition has been rendered much less intimate, and the foam rubber article may be easily stripped from the mold without damage resulting thereto. In some instances a definite slight air space occurs between the foam molding and the pin plate.

In molds constructed with hollow metallic core pins, some difficulty has been previously experienced to obtain rapid foam freezing rates in areas adjoining the tip of the pins. The "cold" is conducted down the side of the pin and at the same time it is dissipated into the adjoining mass of foam. As a consequence, the temperature of the tip of a pin lags behind the temperature of the pin plate. This can be partially corrected by using pins of greater wall thickness than would be warranted by requirements of mechanical strength with a consequent penalty in increased heat-loads in each cycle. To facilitate heat transfer from the pin plate 29 to the tip 32 of the core pins it has been found desirable to partially fill the core pins with a liquid having a high thermal conductivity and a high specific heat. Such liquid as shown at 34 in Figure 4 might be an eutectic sodium chloride or calcium chloride brine which will freeze at from zero to minus 5° F. and will, accordingly freeze during the pre-frosting of the pins according to the present invention. The heat absorptive capacity of this liquid within the core pins at the tips thereof will serve to maintain an even coating of the ice about the entire pin as the same is submersed in the foamed rubber composition 30 within the lower mold member 28. Water which at a temperature of 32° F. has a thermal conductivity ($k$) of .343 where $k$ is defined as B. t. u. (hr.) (ft.$^2$) (°F./ft.) which will turn to ice having a thermal conductivity $k$ of 1.26 is also satisfactory as a liquid to be placed in the core pins. Where expansion of the liquid upon freezing is to be anticipated, it is, of course, necessary that an air space such as at 33 be left within the core pin so that expansion of the liquid 34 will not crack or otherwise damage the same.

While in the foregoing description reference has been made to specific example and particular embodiments of the method and apparatus of the present invention, it is to be understood that such reference is for purposes of description only and does not limit the scope of the present invention as particularly defined in the attached claims. The foregoing references to latex or foam rubber compositions are meant to include not only the products of the latices natural rubber, but also to those of the well-known synthetic rubber-like compositions as well.

I claim:

1. A method for the manufacture of a molded foam rubber article in a mold which includes a hollow mold member having an interior surface carrying a plurality of core pins extending into the mold cavity when the mold is closed; comprising the steps of circulating a liquid coolant between the walls of said mold, precoating said interior surface, said pins and all joints between said surface and pins with a smooth, continuous layer of ice, maintaining said layer until the foam rubber within the mold cavity has coagulated, said layer actually determining the size and shape of the molded article.

2. A method for the manufacture of a molded foam rubber article in a mold which includes a hollow mold member having an interior surface carrying a plurality of core pins extending into the mold cavity when the mold is closed; comprising the steps of circulating a liquid coolant between the walls of said mold, forming a continuous film of ice to completely cover said interior surface, said pins and said joints therebetween, introducing a frothed latex dispersion into the mold, closing the mold while continuing the circulation of the liquid coolant, maintaining the low temperature of the cavity walls to freeze said dispersion and to maintain said film of ice, passing a fluid coagulant through the frozen composition until it becomes irreversibly gelled, and circulating a heating medium through the walls to vulcanize the latex.

References Cited in the file of this patent

UNITED STATES PATENTS

| | | |
|---|---|---|
| 1,599,924 | Sanborn | Sept. 14, 1926 |
| 2,251,785 | Dons | Aug. 5, 1941 |
| 2,351,529 | Luxenberger | June 13, 1944 |
| 2,364,036 | MacKay | Nov. 28, 1944 |
| 2,432,353 | Talalay | Dec. 9, 1947 |
| 2,482,949 | Tankovich | Sept. 27, 1949 |
| 2,526,165 | Smith | Oct. 17, 1950 |
| 2,604,663 | Talalay | July 29, 1952 |